(12) United States Patent
Vojkovich et al.

(10) Patent No.: US 7,787,048 B1
(45) Date of Patent: Aug. 31, 2010

(54) MOTION-ADAPTIVE VIDEO DE-INTERLACER

(75) Inventors: Mark M. Vojkovich, Sunnyvale, CA (US); Hassane S. Azar, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1134 days.

(21) Appl. No.: 11/222,893

(22) Filed: Sep. 8, 2005

(51) Int. Cl.
H04N 7/01 (2006.01)
H04N 11/20 (2006.01)
(52) U.S. Cl. ...................... 348/452; 348/448
(58) Field of Classification Search ......... 348/441–459, 348/699–702
See application file for complete search history.

(56) References Cited

U.S. PATENT DOCUMENTS

| | | | |
|---|---|---|---|
| 5,353,119 A | 10/1994 | Dorricott et al. | |
| 5,550,933 A | 8/1996 | Stetten | |
| 5,943,099 A * | 8/1999 | Kim | 348/448 |
| 6,133,957 A | 10/2000 | Campbell | |
| 6,181,382 B1 * | 1/2001 | Kieu et al. | 348/459 |
| 6,459,455 B1 * | 10/2002 | Jiang et al. | 348/452 |
| 6,466,700 B1 | 10/2002 | Makram-Ebeid | |
| 6,489,998 B1 | 12/2002 | Thompson et al. | |
| 6,614,484 B1 | 9/2003 | Lim et al. | |
| 6,757,022 B2 | 6/2004 | Wredenhagen et al. | |
| 6,798,927 B2 | 9/2004 | Kosugi et al. | |
| 7,012,649 B2 * | 3/2006 | Michel | 348/448 |
| 7,023,487 B1 | 4/2006 | Adams | |
| 7,075,580 B2 | 7/2006 | Jiang | |
| 7,154,556 B1 | 12/2006 | Wang et al. | |
| 7,161,602 B2 | 1/2007 | Shan | |
| 7,265,791 B2 * | 9/2007 | Song et al. | 348/448 |
| 7,277,581 B1 | 10/2007 | Lightstone et al. | |
| 7,292,738 B1 | 11/2007 | Ma et al. | |
| 7,354,708 B2 | 4/2008 | Hall et al. | |
| 7,372,471 B1 | 5/2008 | Hutchins | |
| 7,379,626 B2 | 5/2008 | Lachine et al. | |
| 7,403,234 B2 | 7/2008 | Lertrattanapanich et al. | |
| 7,515,204 B1 | 4/2009 | He et al. | |
| 2002/0108521 A1 | 8/2002 | Velde et al. | |
| 2003/0095205 A1 | 5/2003 | Orlick et al. | |
| 2004/0246374 A1 * | 12/2004 | Mishima et al. | 348/441 |
| 2006/0098877 A1 | 5/2006 | Barnes et al. | |
| 2006/0244861 A1 | 11/2006 | Lertrattanapanach et al. | |
| 2007/0052845 A1 | 3/2007 | Adams | |
| 2008/0056617 A1 | 3/2008 | Wei et al. | |

OTHER PUBLICATIONS

Office Action, U.S. Appl. No. 11/232,484, dated Jul. 14, 2009.

* cited by examiner

*Primary Examiner*—M. Lee
(74) *Attorney, Agent, or Firm*—Patterson & Sheridan, LLP (57) ABSTRACT

One embodiment of a motion-adaptive video de-interlacing system includes a motion estimator and a pixel interpolator. The motion estimator determines the magnitude of motion associated with each pixel within a de-interlaced video frame. In some instances, as determined by the motion values, the pixel interpolator produces final pixel values by blending between pixel values produced through different de-interlacing methods optimized for different levels of pixel motion. The present invention advantageously produces de-interlaced video frames having relatively better picture quality than those produced using prior art techniques, especially for small pixel motions.

23 Claims, 6 Drawing Sheets

MOTION-ADAPTIVE VIDEO DE-INTERLACER

BACKGROUND OF THE INVENTION

1. Field of the Invention

Embodiments of the present invention relate generally to video processing and more specifically to a motion-adaptive video de-interlacer.

2. Description of the Related Art

Video frames are typically encoded in an interlaced format comprising a first field and a second field, each field having alternating lines of the video frame and each field being temporally separated. Video images are typically encoded and transmitted in such an interlaced format as a compromise between bandwidth and video image resolution. Since interlaced video frames are displayed using only half the lines of a full video frame, less system bandwidth is required to process and display these types of video frames. However, since the human eye typically cannot resolve a single video field, but rather, blends the first field and the second field, the perceived image has the vertical resolution of both fields combined.

Some types of video screens, such as progressive displays, require the use of de-interlaced video frames instead of interlaced video frames. When using such displays, the video frames encoded in an interlaced format must be de-interlaced prior to display. There are several well-known methods to construct de-interlaced video frames. One such method is commonly referred to as the "weave" method in which both the first field and the second field are displayed simultaneously by weaving together the alternating lines of the two fields. This method produces de-interlaced video frames with relatively good picture quality so long as the images depicted within the video frame are not moving. Another de-interlacing method is commonly referred to as the "bob" method in which a de-interlaced video frame is constructed from a single video field using vertical interpolation to "fill in" the video data missing from the single field. In contrast to the weave method, this method produces de-interlaced video frames with relatively good picture quality when the images depicted within the video frame are moving.

There are several known ways to create a de-interlaced video frame by combining the results of the weave method and the bob method. These "hybrid" techniques attempt to produce video frames higher in quality than those produced using either the weave or bob method alone. One such method uses a difference function to determine the presence or absence of motion within the interlaced video frame on a pixel-by-pixel basis. The difference function compares the value (e.g., luminance values) of a pixel in a current video frame with the value of the same pixel in the previous video frame. If the value of the pixel changes between the video frames, then the assumption is that the pixel is moving. This motion information is then used to select either the weave or the bob method to construct that pixel in the de-interlaced video frame. For example, if the difference function indicates that a pixel is moving, then the bob method is used to construct the pixel in the de-interlaced video frame. If, on the other hand, the difference function indicates that the pixel is not moving, then the weave method is used to construct the pixel in the de-interlaced video frame.

One drawback of this approach is that the difference function does not calculate the magnitude of motion attributed to a pixel. Thus, the bob method is always used whenever any motion is detected. However, as is well-known, the bob method displays an undesirable processing artifact when de-interlacing video images with slow moving objects. To illustrate, consider the top edge of a box slowly moving vertically toward the top of the screen. If the top edge of the box precisely aligns with a video line of the first field, then the corresponding vertically interpolated video frame includes the top edge of the box, but the vertically interpolated video frame corresponding to the second field does not include the top edge of the box. Consequently, as the box moves, the top edge of the box appears to flicker as the top edge aligns with the lines from the first field and the second field.

As the foregoing illustrates, what is needed in the art is a way to de-interlace video frames that produces higher quality frames than current techniques.

SUMMARY OF THE INVENTION

One embodiment of the present invention sets forth a computing device configured to produce a de-interlaced video frame. The computing device includes a first engine configured to produce a first de-interlaced video frame, a second engine configured to produce a second de-interlaced video frame, and a third engine configured to produce a third de-interlaced video frame. The computing device also includes a motion estimator configured to determine a motion value for a pixel in the de-interlaced video frame, and a pixel interpolator configured to produce a value for the pixel based on the motion value. In another embodiment, the first engine is a weaving engine, the second engine is a low-pass filter, and the third engine is a vertical interpolation engine.

One advantage of the disclosed system is that the motion values used indicate not only the presence of motion, but also the magnitude of the motion. If the magnitude of the motion within a scene is relatively small, then portions of the de-interlaced video frame may be produced, for example, by using the low-pass-filtered output of the low-pass filter or by blending the low-pass-filtered output of the low-pass filter with either the output of the weaving engine or the output of the vertical interpolation engine. This approach reduces motion artifacts associated with small motions, thereby increasing overall picture quality relative to prior art systems and techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
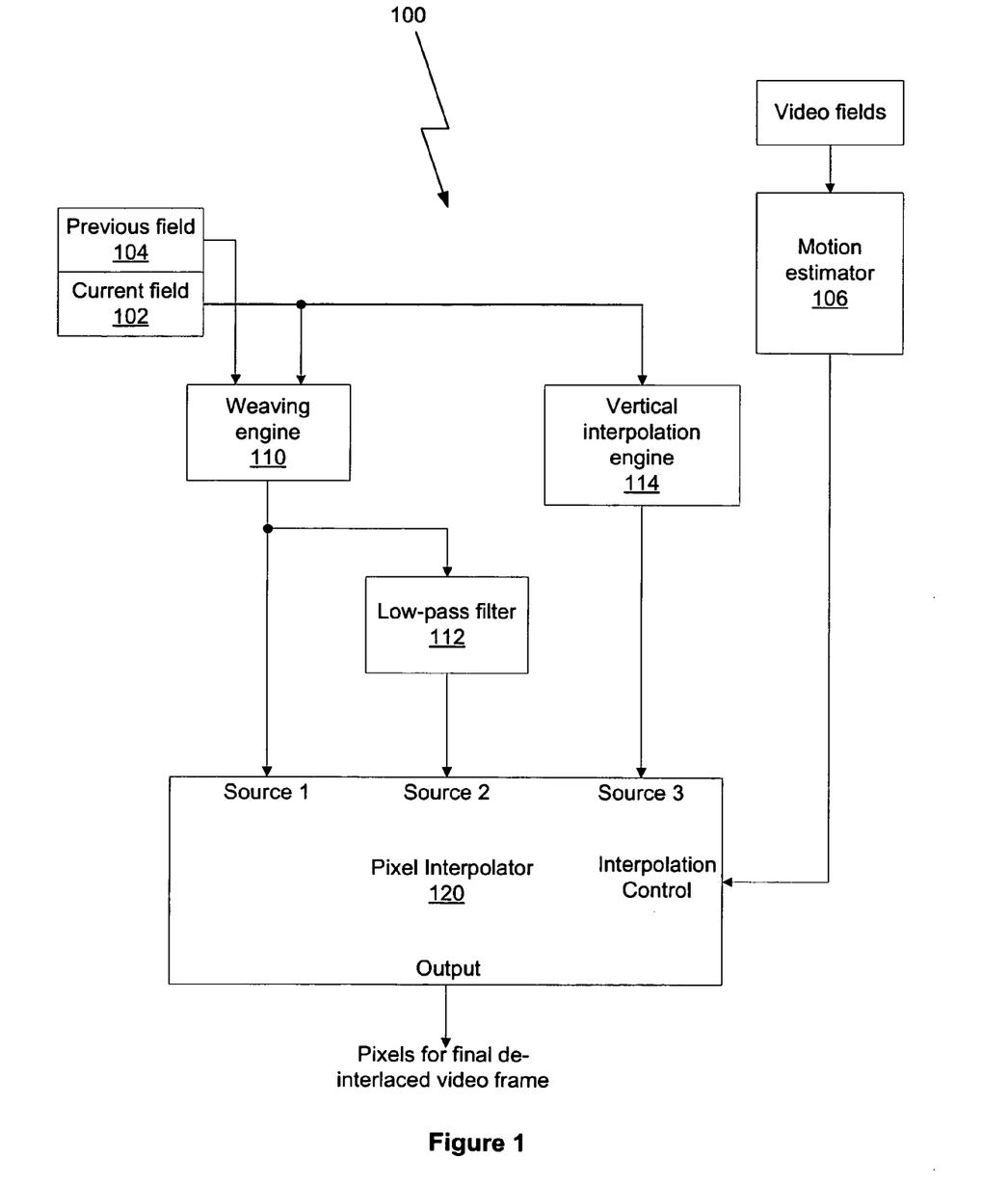
FIG. 1 is a conceptual diagram illustrating a motion-adaptive video de-interlacer, according to one embodiment of the invention.

FIG. 1 is a conceptual diagram illustrating a motion-adaptive video de-interlacer 100, according to one embodiment of the invention. As shown, the motion-adaptive video de-interlacer 100 includes, without limitation, a motion estimator 106, a weaving engine 110, a low-pass filter 112, a vertical interpolation engine 114 and a pixel interpolator 120. The motion-adaptive video de-interlacer 100 produces a de-interlaced video frame based upon a current video field 102 and a previous video field 104 (hereinafter referred as a "final de-interlaced video frame"). Typically, the current video field 102 and the previous video field 104 have a temporal relationship, where the current video field 102 is the video field transmitted immediately subsequent to the previous video field 104. That is, the current video field 102 and the previous video field 104 are temporally adjacent video fields.

In one embodiment, the weaving engine 110 combines the pixels from the current video field 102 and the previous video field 104 using a standard weave method (previously referenced herein) to produce a de-interlaced video frame. The output of the weaving engine 110 is transmitted to both the pixel interpolator 120 and the low-pass filter 112.

The low-pass filter 112 filters the de-interlaced video frame produced by the weaving engine 110 and transmits the resulting low-pass-filtered, de-interlaced video frame to the pixel interpolator 120. As described in greater detail below in conjunction with FIG. 2, the low-pass filter produces a de-interlaced video frame with increased picture quality for images with relatively small amounts of motion.

The vertical interpolation engine 114 receives pixels from only the current video field 102 and vertically interpolates the missing lines of this video frame to create a vertically-interpolated, de-interlaced video frame. Vertical interpolation may be performed using a standard bob technique (previously referenced herein), a bob technique with edge preservation or any other technically feasible technique. In one embodiment, vertical interpolation is performed using the techniques described in U.S. patent application Ser. No. 11/232,484, titled "Edge-Preserving Vertical Interpolation," filed on Sep. 21, 2005. The output of the vertical interpolation engine 114 is transmitted to the pixel interpolator 120.

The motion estimator 106 generates a per-pixel motion value for each pixel of the final de-interlaced video frame. As described in greater detail below in conjunction with FIG. 3, the motion of each pixel is derived using two or more video fields (e.g., the current field 102 or the previous field 104 and one or more additional related fields), depending on the motion estimation technique implemented by the motion estimator 106. The output of the motion estimator 106 is transmitted to the pixel interpolator 120.

The pixel interpolator 120 receives the outputs of the weaving engine 110, the low-pass filter 112 and the vertical interpolation engine 114 as well as the motion values generated by the motion estimator 106. The pixel interpolator 120 produces pixels for the final de-interlaced video frame on a pixel-by-pixel basis. More specifically, the pixel interpolator 120 produces pixels for the final de-interlaced video frame by selecting pixels from one or more of the de-interlaced video frames produced by the weaving engine 110, the low-pass filter 112 and the vertical interpolation engine 114, by blending pixels from the de-interlaced video frame produced by the weaving engine 110 with pixels from the de-interlaced video frame produced by the low-pass filter 112, or by blending pixels from the de-interlaced video frame produced by the low-pass filter 112 with pixels from the de-interlaced video frame produced by the vertical interpolation engine 114. The manner in which the pixel interpolator 120 produces a given pixel of the final de-interlaced video frame is determined by the motion value generated by the motion estimator 106 for that particular pixel. The operation of the pixel interpolator 120 is described in greater detail below in conjunction with FIGS. 4A and 4B.

Figure 2:
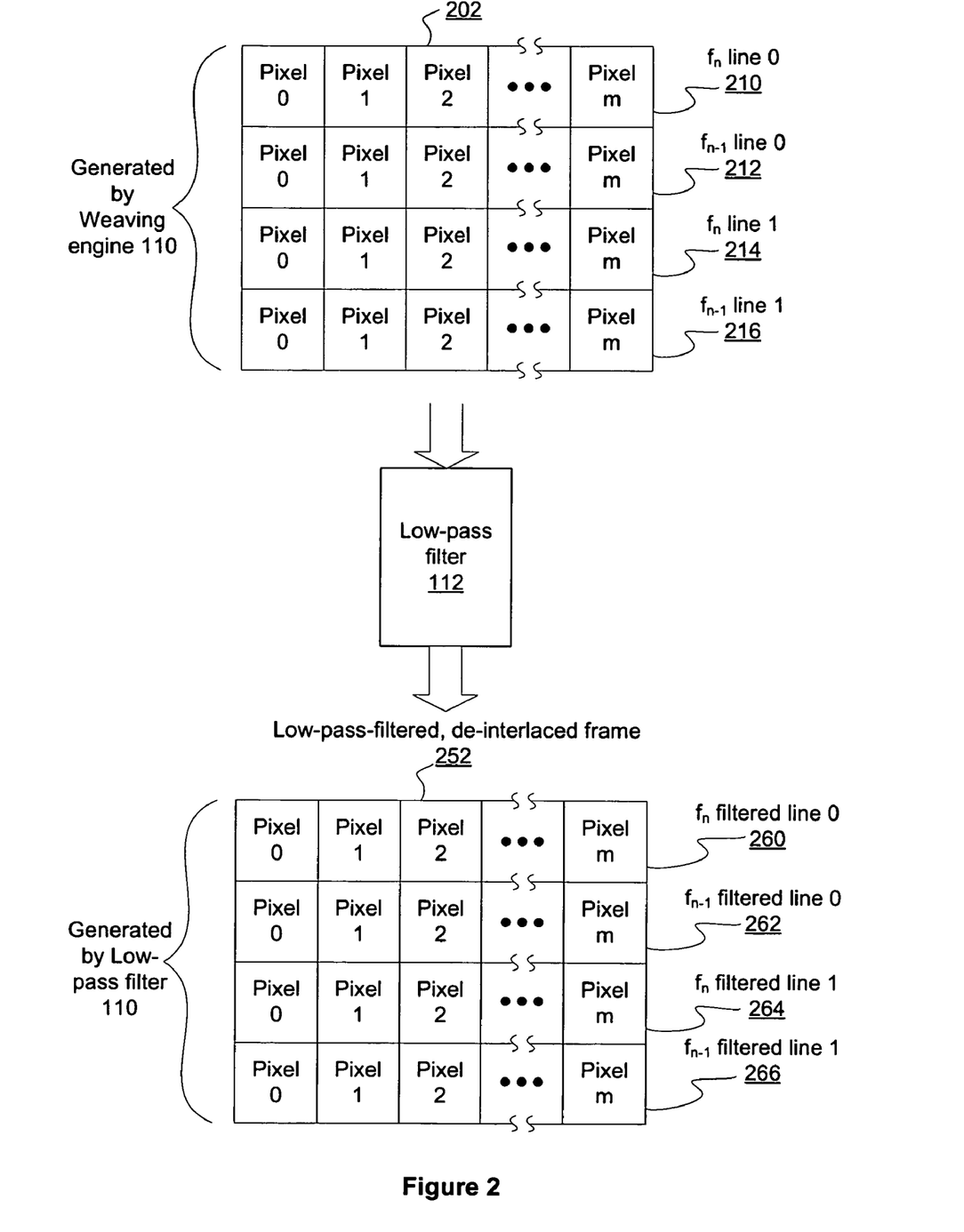
FIG. 2 is a conceptual diagram illustrating the processing functionality of the low-pass filter of FIG. 1, according to one embodiment of the invention.

FIG. 2 is a conceptual diagram illustrating the processing functionality of the low-pass filter 112 of FIG. 1, according to one embodiment of the invention. As shown and previously described, the low-pass filter 112 receives the de-interlaced video frame output from the weaving engine 110. Persons skilled in the art will recognize that de-interlaced video frame 202 shows only a portion of the actual de-interlaced video frame that would be produced by the weaving engine 110. Again, the weaving engine 110 combines the current field 102 and the previous field 104 to produce the de-interlaced video frame 202. In one embodiment, lines from the current field 102 are denoted in the figure with $f_n$. Similarly, lines from the previous field 104 are denoted in the figure with $f_{n-1}$. Thus, a first line 210 and a third line 214 of the de-interlaced video frame 202 are taken from the current field 102 ($f_n$), and a second line 212 and a fourth line 216 are taken from the previous field 104 ($f_{n-1}$). In other embodiments, the order of the lines may be switched such that lines from the previous field 104 account for the first line 210 and the third line 214 and lines from the current field 102 account for the second line 212 and the fourth line 216. As a general matter, alternating lines of the de-interlaced video frame 202 come from alternating video fields. Persons skilled in the art will therefore recognize that the order of the lines in the de-interlaced video frame 202 in no way limits the scope of the present invention.

The low-pass filter 112 filters each line of the de-interlaced video frame 202 and produces a low-pass-filtered, de-interlaced video frame 252. Any technically feasible low-pass filtering method may be used to produce the pixels of the low-pass-filtered, de-interlaced video frame 252. In one embodiment a three-tap finite impulse response (FIR) filter with 0.25, 0.5, and 0.25 coefficients is used to provide vertical low-pass filter functionality. In such an embodiment, for example, Pixel 0 of a line 262 of the low-pass-filtered, de-interlaced video frame 252 may be constructed by selecting Pixel 0 from each of the line 210, the line 212 and the line 214 of the de-interlaced video frame 202 and then filtering these selected pixels with the three-tap FIR filter. In alternative embodiments, any type of desired low-pass filtering may be implemented.

Again, as is well-known, the weave method is well-suited for video images with no motion. However, if the objects depicted within the video frame are moving a relatively small amount, then the weave method produces a de-interlaced image with motion artifacts, typically referred to as combing, that reduce overall picture quality. The reason for this phenomenon is that a moving object is displaced both spatially and temporally between the previous field 104 and the current field 102 and, therefore, appear in different spatial positions within the two fields. Low-pass filtering such a de-interlaced video frame softens the motion artifacts, resulting in a de-interlaced video frame with increased picture quality. Those skilled in the art will understand that the level of softening may be influenced by the frequency response of the low-pass filter 112. If the low-pass filter 112 is an FIR filter, then the frequency response of the filter may be modified by changing the filter coefficients.

Figure 3:
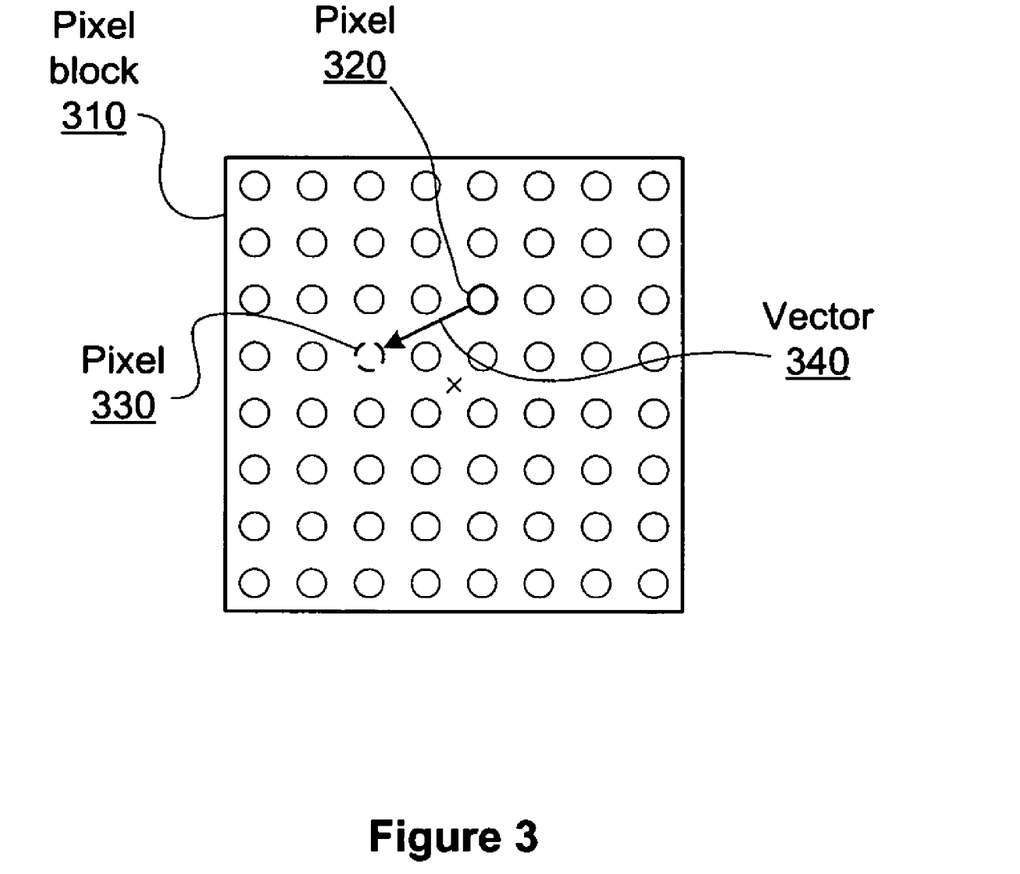
FIG. 3 is an example of pixel motion that may be measured by the motion estimator of FIG. 1, according to one embodiment of the invention.

FIG. 3 is an example of pixel motion that may be measured by the motion estimator 106 of FIG. 1, according to one embodiment of the invention. Importantly, the motion estimator 106 a "true" motion estimator. As is well-known, a true motion estimator oftentimes attempts to estimate the actual motion of individual pixels within a block of pixels by first estimating the actual motion of the pixel block within a frame or field. A per-pixel motion field for the individual pixels within the pixel block may then be generated by interpolating the estimated motion of the pixel block. The interpolation may be a simple linear interpolation or a more advanced motion field interpolation. By contrast, motion estimators that are commonly used for video coding, such as MPEG encoding or H.264 encoding, predict the motion of a block of pixels within a current frame or field by finding a "best match" for the pixel block in a previous or future frame or field. An advantage of using a true motion estimator for de-interlacing is that individual pixel motion can be estimated. The de-interlacing process implemented by the pixel interpolator 120 may then be guided on a pixel-by-pixel basis using the determined pixel motions.

True motion estimators, such as the motion estimator 106, typically estimate a direction and a magnitude of motion for each pixel in a video frame. For example, as shown in FIG. 3, consider a pixel within a pixel block 310 having an initial position denoted by a pixel 320 and a final position denoted by a pixel 330. The motion estimator 106 estimates the final position of the pixel (pixel 330) and produces a vector 340 that indicates the estimated magnitude and direction of the pixel's motion. Although the motion estimator 106 may be configured to estimate both a magnitude and direction of the motion of a pixel, only the magnitude of the motion (referred to herein as the "motion value" for a pixel) is transmitted to the pixel interpolator 120. Each motion value typically expresses the magnitude of a given pixel motion in quarter-pixel units. For example, if the pixel 330 (the final pixel position) is eight quarter-pixels away from the pixel 320 (the initial pixel position), then the pixel has a motion value of eight quarter-pixels. However, in alternative embodiments, the motion values produced by the motion estimator 106 may be expressed in any type of units that enables the overall functionality of the motion-adaptive video de-interlacer 100, described herein.

The functionality of the motion estimator 106 may be implemented using any technically feasible true motion estimation technique. Various examples of true motion estimators are described in Chapter 6 of "Video Processing for Multimedia Systems," by Gerard de Haan, University Press Eindhoven, 2000.

Figure 4A:
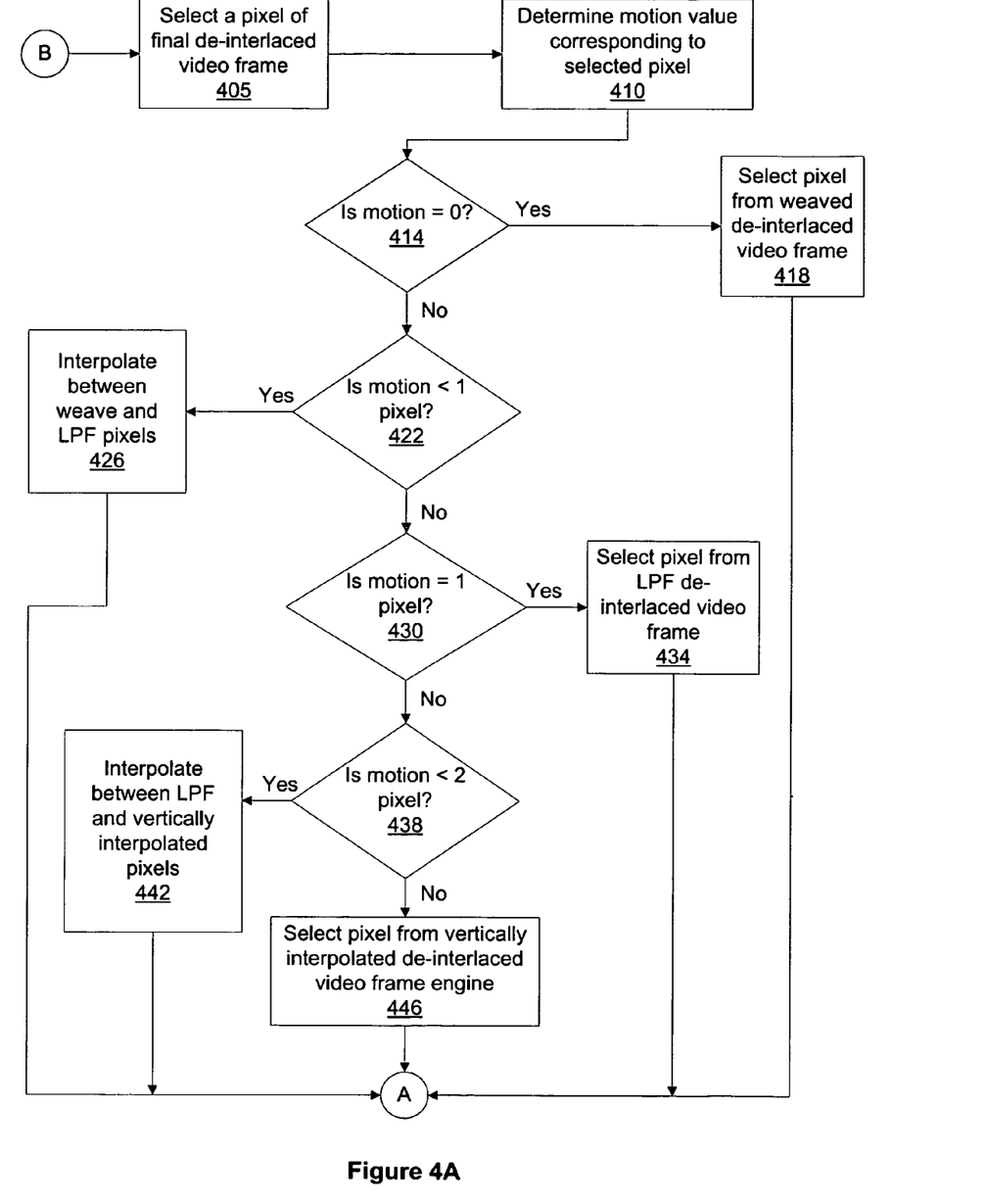
FIGS. 4A and 4B set forth a flow diagram of method steps for determining the output of the pixel interpolator of FIG. 1, according to one embodiment of the invention.
Figure 4B:
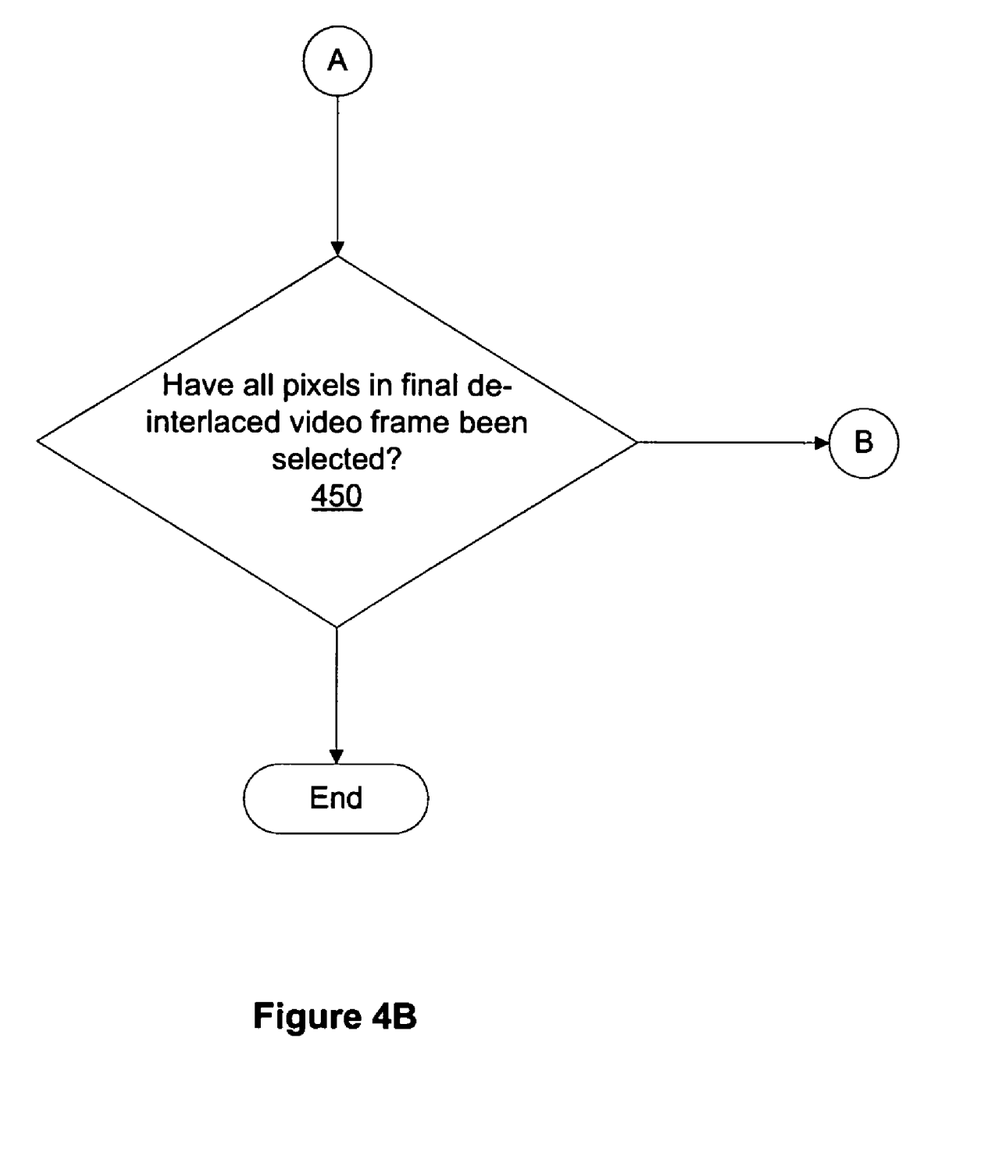

FIGS. 4A and 4B set forth a flow diagram of method steps for determining the output of pixel interpolator 120 of FIG. 1, according to one embodiment of the invention. Although the method is described with respect to the pixel interpolator 120, persons skilled in the art will recognize that any system configured to perform the method steps in any order is within the scope of this invention.

As described in greater detail below, the pixel interpolator 120 produces the final de-interlaced video frame on a pixel-by-pixel basis. The pixel interpolator 120 first selects a given pixel in the final de-interlaced video frame and then produces that pixel by selecting a corresponding pixel from the de-interlaced video frame produced by the weaving engine 110, the low-pass filter 112 or the vertical interpolation engine 114, by blending a corresponding pixel from the de-interlaced video frame produced by the weaving engine 110 with a corresponding pixel from the de-interlaced video frame produced by the low-pass filter 112, or by blending a corresponding pixel from the de-interlaced video frame produced by the low-pass filter 112 with a corresponding pixel from the de-interlaced video frame produced by the vertical interpolation engine 114. The manner in which the pixel interpolator 120 produces the selected pixel is determined by the motion value generated by the motion estimator 106 for that particular pixel. A completed final de-interlaced video frame results after the pixel interpolator has selected and produced each pixel in the final de-interlaced video frame.

The method for determining the output of the pixel interpolator 120 begins in step 405, where the pixel interpolator 120 selects a pixel in the final de-interlaced video frame. In step 410, the pixel interpolator 120 determines the motion value associated with the selected pixel. As previously described, the motion value is determined by the motion estimator 106 and indicates the magnitude of the movement of the selected pixel within the final de-interlaced video frame. In step 414, the pixel interpolator 120 determines if the motion value associated with the selected pixel is zero pixels. If the motion value is zero pixels, then in step 418, the pixel interpolator 120 selects the pixel from the de-interlaced video frame produced by the weaving engine 110 corresponding to the selected pixel. The value of the pixel from the de-interlaced video frame produced by the weaving engine 110 is then used as the value of the selected pixel in the final de-interlaced video frame. The method then proceeds to step 450 of FIG. 4B.

If, on the other hand, the motion value associated with the selected pixel is not zero pixels, then in step 422, the pixel interpolator 120 determines if the motion value associated with the selected pixel is less than one pixel. If the motion value is less than one pixel, then in step 426, the pixel interpolator 120 selects the pixel from the de-interlaced video frame produced by the weaving engine 110 corresponding to the selected pixel and the pixel from the de-interlaced video frame produced by the low-pass filter 112 corresponding to the selected pixel. The pixel interpolator 120 blends the values of these two corresponding pixels to produce the value of the selected pixel in the final de-interlaced video frame. In one embodiment, the pixel interpolator 120 uses linear interpolation to blend the values of the two corresponding pixels. The weight assigned to each value is based on the motion value associated with the selected pixel. For example, if the motion value is close to one, then a proportionally greater weight is given to the value of the corresponding pixel in the de-interlaced video frame produced by the low-pass filter 112. However, if the motion value is close to zero, then a proportionally greater weight is given to the value of the corresponding pixel in the de-interlaced video frame produced by the weaving engine 110. The method then proceeds to step 450 of FIG. 4B.

If, in step 422, the pixel interpolator 120 determines that the motion value associated with the selected pixel is not less than one pixel, then in step 430, the pixel interpolator 120 determines if the motion value associated with the selected pixel is one pixel. If the motion value is one pixel, then in step 434, the pixel interpolator 120 selects the pixel from the de-interlaced video frame produced by the low-pass filter 112 corresponding to the selected pixel. The value of the pixel from the de-interlaced video frame produced by the low-pass filter 112 is then used as the value of the selected pixel in the final de-interlaced video frame. The method then proceeds to step 450 of FIG. 4B.

If, on the other hand, the motion value associated with the selected pixel is not one pixel, then in step 438, the pixel interpolator 120 determines if the motion value associated with the selected pixel is less than two pixels. If the motion value is less than two pixels, then in step 442, the pixel interpolator 120 selects the pixel from the de-interlaced video frame produced by the low-pass filter 112 corresponding to the selected pixel and the pixel from the de-interlaced video frame produced by the vertical interpolation engine 114 corresponding to the selected pixel. The pixel interpolator 120 blends the values of these two corresponding pixels to produce the value of the selected pixel in the final de-interlaced video frame. Again, in one embodiment, the pixel interpolator 120 uses linear interpolation to blend the values of the two corresponding pixels, where the weight assigned to each value is based on the motion value associated with the selected pixel. The method then proceeds to step 450 of FIG. 4B.

If, in step 438, the motion value is not less than two pixels, then in step 446, the pixel interpolator 120 selects the pixel from the de-interlaced video frame produced by vertical interpolation engine 114 corresponding to the selected pixel. The value of the pixel from the de-interlaced video frame produced by the vertical interpolation engine 114 is then used as the value of the selected pixel in the final de-interlaced video frame. The method then proceeds to step 450 of FIG. 4B.

In step 450 of FIG. 4B, the pixel interpolator 120 determines if all of the pixels in the final de-interlaced video frame have been selected. If all of the pixels have been selected, then the method terminates. However, if all of the pixels have not yet been selected, then the method returns to step 405 of FIG. 4A.

One advantage of the disclosed system and method is that the motion values used indicate not only the presence of motion, but also the magnitude of the motion. If the magnitude of the motion within a scene is relatively small, then portions of the de-interlaced video frame may be produced using the low-pass-filtered output of the low-pass filter 112 or by blending the low-pass-filtered output of the low-pass filter 112 with either the output of the weaving engine 110 or the output of the vertical interpolation engine 114. This approach reduces motion artifacts associated with small motions, thereby increasing overall picture quality relative to prior art systems and techniques.

Figure 5:
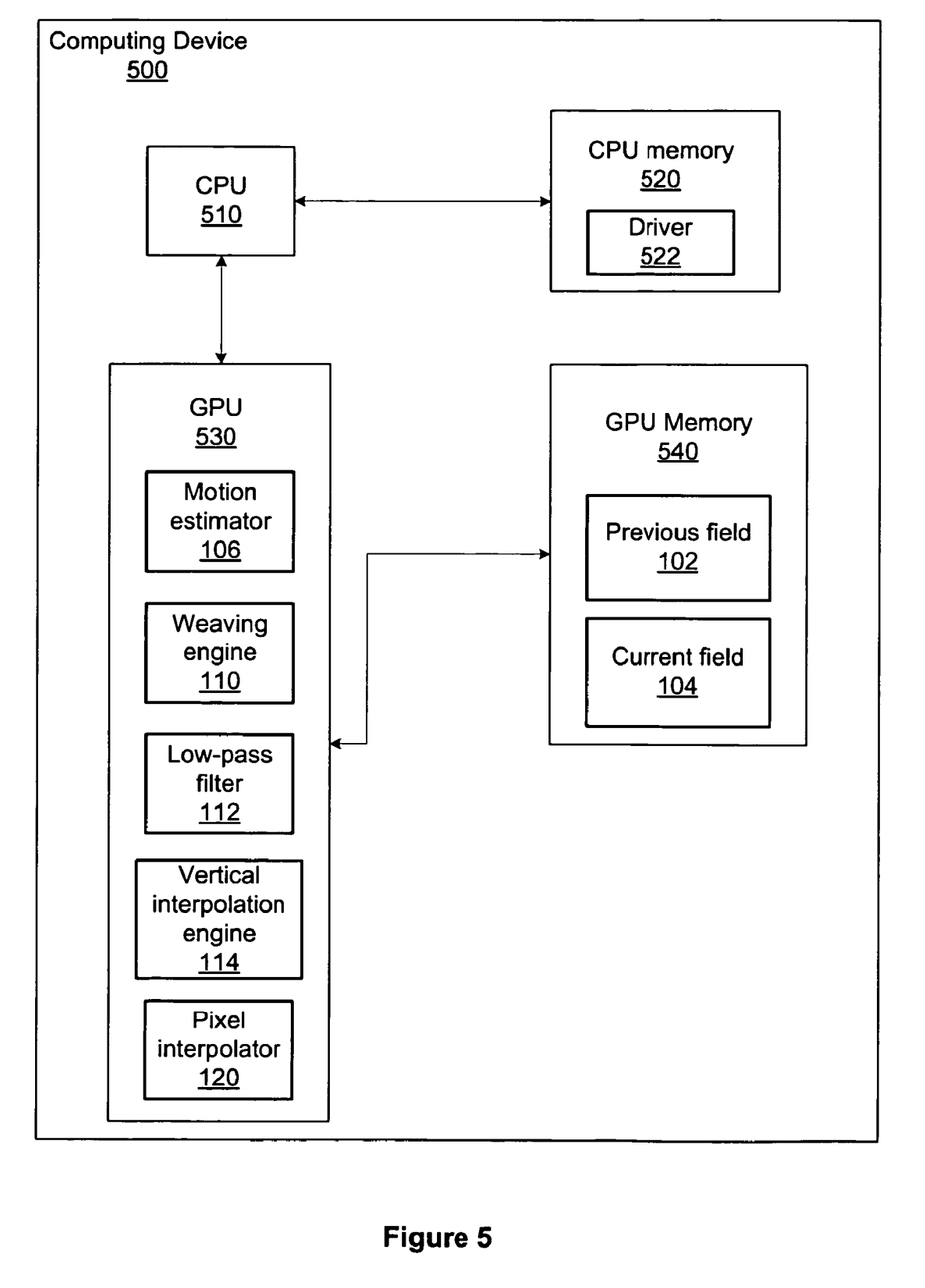
FIG. 5 is a conceptual drawing of a computing device that may be configured to perform one or more aspects of the present invention.

FIG. 5 is a conceptual drawing of a computing device 500 that may be configured to perform one or more aspects of the present invention. The computing device 500 includes, without limitation, a central processing unit (CPU) 510, a CPU memory 520, a graphics processing unit (GPU) 530 and a GPU memory 540.

The CPU 510 is coupled to the CPU memory 520, which stores data and programs such as a driver program 522 that is executed by the CPU 510. The CPU 510 also is coupled to the GPU 530, which may include the motion estimator 106, the weaving engine 110, the low-pass filter 112, the vertical interpolation engine 114 and the pixel interpolator 120. As described herein, the pixel interpolator 120 produces a final de-interlaced video frame using a motion values produced by the motion estimator 106. The GPU 530 also is coupled to a GPU memory 540, which stores instructions and data, such as the current video field 102 and the previous video field 104. In alternative embodiments, the functionality of each of the motion estimator 106, the weaving engine 110, the low-pass filter 112, the vertical interpolation engine 114 and the pixel interpolator 120 may be implemented in software, hardware or a combination of software and hardware. For example, the driver program 522 may include each of the motion estimator 106, the weaving engine 110, the low-pass filter 112, the vertical interpolating engine 114 and the pixel interpolator 120 such that the functionality of each unit is implemented on the CPU 510.

While the foregoing is directed to embodiments of the present invention, other and further embodiments of the invention may be devised without departing from the basic scope thereof, and the scope thereof is determined by the claims that follow.

The invention claimed is:

1. A computing device configured to produce a de-interlaced video frame, the computing device comprising:
   a first engine configured to produce a first de-interlaced video frame;
   a second engine configured to produce a second de-interlaced video frame;
   a third engine configured to produce a third de-interlaced video frame;
   a motion estimator configured to determine a motion value for a pixel in the de-interlaced video frame wherein the pixel has an initial position and estimated find position, and the motion value indicates the magnitude of motion associated with the pixel; and
   a pixel interpolator configured to produce a value for the pixel based on the motion value and a value of at least one corresponding pixel in at least one of the first, second or third de-interlaced video frames.

2. The computing device of claim 1, wherein the value for the pixel equals a value of a corresponding pixel in the first de-interlaced video frame, if the motion value is equal to a first threshold.

3. The computing device of claim 1, wherein the value for the pixel equals a value of a corresponding pixel in the second de-interlaced video frame, if the motion value is equal to a second threshold.

4. The computing device of claim 1, wherein the value for the pixel equals a value of a corresponding pixel in the third de-interlaced video frame, if the motion value is equal to or greater than a third threshold.

5. The computing device of claim 1, wherein the value for the pixel is derived by blending a value of a corresponding pixel in the first de-interlaced video frame with a value of a corresponding pixel in the second de-interlaced video frame, if the motion value is greater than a first threshold and less than a second threshold.

6. The computing device of claim 1, wherein the value of the pixel is derived by blending a value of a corresponding pixel in the second de-interlaced video frame with a value of a corresponding pixel in the third de-interlaced video frame, if the motion value is greater than a second threshold and less than a third threshold.

7. The computing device of claim 1, wherein the first engine is a weaving engine, the second engine is a low-pass filter, and the third engine is a vertical interpolation engine.

8. The computing device of claim 7, wherein the value for the pixel equals a value of a corresponding pixel in the first de-interlaced video frame, if the motion value is equal to approximately zero pixels, the value for the pixel equals a value of a corresponding pixel in the second de-interlaced video frame, if the motion value is equal to approximately one pixel, and the value for the pixel equals a value of a corresponding pixel in the third de-interlaced video frame, if the motion value is equal to or greater than approximately two pixels.

9. The computing device of claim 8, wherein the value for the pixel is derived by blending a value of a corresponding pixel in the first de-interlaced video frame with a value of a corresponding pixel in the second de-interlaced video frame, if the motion value is greater than approximately zero pixels and less than approximately one pixel, and the value for the pixel is derived by blending a value of a corresponding pixel in the second de-interlaced video frame with a value of a corresponding pixel in the third de-interlaced video frame, if the motion value is greater than approximately one pixel and less than approximately two pixels.

10. The computing device of claim 7, wherein the low-pass filter is a three-tap finite impulse response filter with coefficients equal to 0.25, 0.5 and 0.25.

11. The computing device of claim 7, wherein the vertical interpolation engine performs vertical interpolation with edge preservation.

12. A method of producing a de-interlaced video frame, the method comprising:
   selecting a pixel in the de-interlaced video frame that has an initial position and an estimated final position;
   determining a motion value for the pixel that indicates the magnitude of motion associated with the pixel;
   producing a value for the pixel based on the motion value as well as values of one or more corresponding pixels in one or more of a first de-interlaced video frame, a second de-interlaced video frame and a third de-interlaced video frame.

13. The method of claim 12, wherein the step of producing a value of the pixel comprises using a value of a corresponding pixel in the first de-interlaced video frame, if the motion value is equal to a first threshold.

14. The method of claim 13, wherein the first threshold is approximately zero pixels.

15. The method of claim 12, wherein the step of producing a value for the pixel comprises using a value of a corresponding pixel in the second de-interlaced video frame, if the motion value is equal to a second threshold.

16. The method of claim 15, wherein the second threshold is approximately one pixel.

17. The method of claim 12, wherein the step of producing a value for the pixel comprises using a value of a corresponding pixel in the third de-interlaced video frame, if the motion value is equal to or greater than a third threshold.

18. The method of claim 17, wherein the third threshold is approximately two pixels.

19. The method of claim 12, wherein the step of producing a value for the pixel comprises blending a value of a corresponding pixel in the first de-interlaced video frame with a value of a corresponding pixel in the second de-interlaced video frame, if the motion value is greater than a first threshold and less than a second threshold.

20. The method of claim 19, wherein the first threshold is approximately zero pixels and the second threshold is approximately one pixel.

21. The method of claim 12, wherein the step of producing a value for the pixel comprises blending a value of a corresponding pixel in the second de-interlaced video frame with a value of a corresponding pixel in the third de-interlaced video frame, if the motion value is greater than a second threshold and less than a third threshold.

22. The method of claim 21, wherein the second threshold is approximately one pixel and the third threshold is approximately two pixels.

23. The method of claim 12, wherein the first de-interlaced video frame is produced using a weave technique, the second de-interlaced video frame is produced by passing the first de-interlaced video frame through a low-pass filter, and the third de-interlaced video frame is producing using a vertical interpolation technique with edge preservation.

* * * * *

UNITED STATES PATENT AND TRADEMARK OFFICE
CERTIFICATE OF CORRECTION

| | | |
|---|---|---|
| PATENT NO. | : 7,787,048 B1 | Page 1 of 1 |
| APPLICATION NO. | : 11/222893 | |
| DATED | : August 31, 2010 | |
| INVENTOR(S) | : Mark M. Vojkovich and Hassane S. Azar | |

It is certified that error appears in the above-identified patent and that said Letters Patent is hereby corrected as shown below:

Column 8, Claim 1, line 14, please replace "the" with --a-- after "in" and before "de-interlaced"

Column 8, Claim 1, line 15, please add "an" after "and" and before "estimated"

Column 8, Claim 1, line 15, please replace "find" with --final--

Signed and Sealed this
Twelfth Day of June, 2012

David J. Kappos
*Director of the United States Patent and Trademark Office*